AUTOMATIC AUDIO STRIP FILM PROJECTOR

Filed April 4, 1962

3 Sheets-Sheet 1

INVENTORS
MARVIN I. MINDELL
KARL RUDZITIS
BY
James P. Malone

INVENTORS
MARVIN I. MINDELL
KARL RUDZITIS
BY James P. Malone

INVENTORS
MARVIN I. MINDELL
KARL RUDZITIS
BY James P. Malone

United States Patent Office 3,187,626

Patented June 8, 1965

3,187,626
AUTOMATIC AUDIO STRIP FILM PROJECTOR

Marvin I. Mindell, Great Neck, and Karl Rudzitis, West Babylon, N.Y., assignors to Viewlex, Inc., Holbrook, N.Y.

Filed Apr. 4, 1962, Ser. No. 185,066
2 Claims. (Cl. 88—28)

This invention relates to strip film projectors and more particularly to such means having audio accompaniment on a magnetic tape and means responsive to synchronizing signals on said tape to advance said film.

The present invention provides a portable audio visual presentation means using strip film having magnetic tape for the audio and also for the synchronizing of the film movement.

The primary purpose of the device is to provide portable means for presenting illustrated lectures for sales presentations or for schools or other educational purposes.

One of the difficulties encountered in designing the present device is that the synchronizing pulses must be separated so that they do not interfere with the audio portion. The present device solves this problem by providing separate tracks on the magnetic tape, one of the tracks providing the audio portion and the other track providing the synchronizing pulses. Separate pickups are provided for each track so that there is never any interference between the audio and the synchronizing pulses. A dual channel amplifier is provided, one channel for the audio and the other for the synchronizing pulses. Therefore no filtering of the synchronizing pulses is required and there is no possibility of noise in the audio track causing improper actuation of the film.

More particularly the present automatic strip film viewing device is a unique self contained strip film projector which operates in conjunction with a magnetic tape playing device also incorporated within the same unit. Both strip film projector and tape player are housed in a small carrying case similar to the common attaché case. The tape player is situated in a pull-out drawer which forms one side of this case.

The magnetic tape plays during the presentation and contains both audio channels for lecture type programs and a separate channel with 3000 cycles trip pulses which automatically advance the strip film. The tape player is similar to the commonly accepted stereo half-track playback machines. The upper track of the tape is devoted to the audio channel and is fed through a conventional audio amplifier to a loud speaker. The lower channel is used for the automatic advance pulse. These 3000 cycle pulses of approximately 750 millisecond duration are fed through an amplifier tuned to 3000 cycles and designed to attenuate all other frequencies. The output of this amplifier is fed to a relay which trips an automatic film advance mechanism which is part of the projection apparatus within the case.

The projector is permanently mounted within the carrying case and contains standard projection optics. In order to obtain the necessary length of light path, two mirrors are utilized and the light is reflected across the depth of the case and back to the screen which is a translucent rear projection type. The advance mechanism is operated by a standard shaded-pole motor which operates, through a gear reduction, a trip bar which contacts a crank lever to advance the film sprocket wheel one frame. The spring causes the motor and trip bar to reverse after the pulses, resetting the unit for the next cycle.

The device is capable of projecting a standard strip film. A manual knob is supplied to advance the film as well as a push button to cause the electrical trip mechanism to operate.

Accordingly, a principal object of the invention is to provide new and improved audio visual presentation means.

Another object of the invention is to provide new and improved film strip projection means with audio accompaniment and means to synchronize the movement of the film strip with the audio accompaniment.

Another object of the invention is to provide new and improved film strip projection means with audio accompaniment and means to synchronize the movement of the film strip with the audio accompaniment wherein said audio and synchronizing means comprises a magnetic tape having two tracks, one for the audio and one for the synchronizing pulses, separate magnetic pickups for each track and a separate amplifier are connected to each pickup.

Another object of the invention is to provide new and improved audio visual strip film presentation means comprising a portable case, projection means and film advancing means in said case, audio means comprising a magnetic tape player and means to actuate and synchronize the film movement with said magnetic tape utilizing a double track magnetic tape having one track for the audio content and one for the synchronizing pulses.

These and other objects of the invention will be apparent from the following specification and drawings, of which FIG. 1 is a perspective view of an embodiment of the invention.

Figure 1:
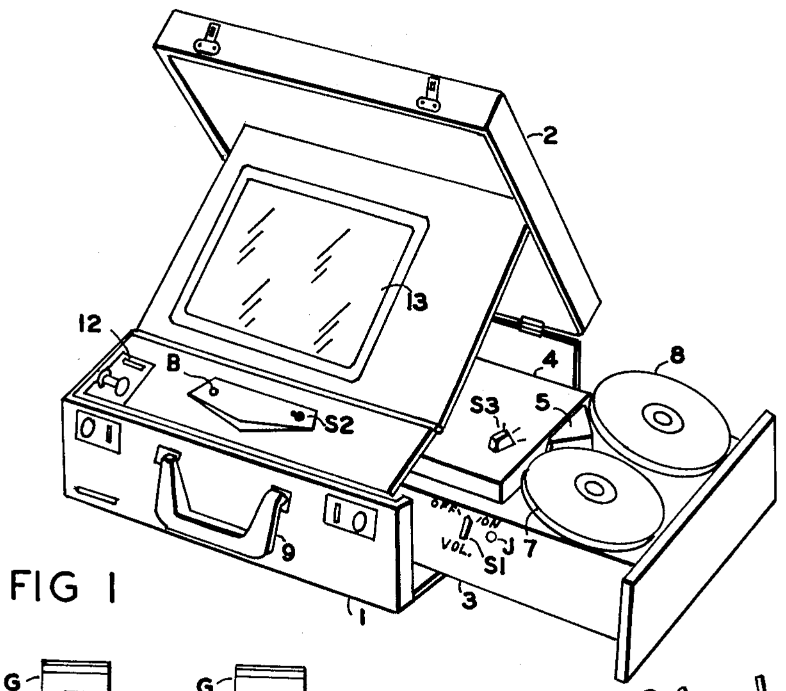

Referring to the figures the invention generally comprises a case 1 having a hinged cover 2 and a sliding deck 3 which includes a magnetic amplifier 4, magnetic pickups 5 and a pair of spools 7 and 8 for the magnetic tape. The deck 3 is mounted on a pair of tracks 10 and 11 mounted in the floor of the case 1.

The film strip is inserted through the slot 12 in the left hand side of the case 1 and the image is projected as will be explained onto the screen 13 which is mounted on a hinged frame which is adapted to be raised to the position shown in FIG. 1 for viewing purposes.

It is necessary to partially pull out the magnetic tape amplifier deck 3 in order to view the film. However, when the device is not in use the deck 3 is slid into the case 1 so that the entire device is easily carried by means of the handle 9.

Figure 2:
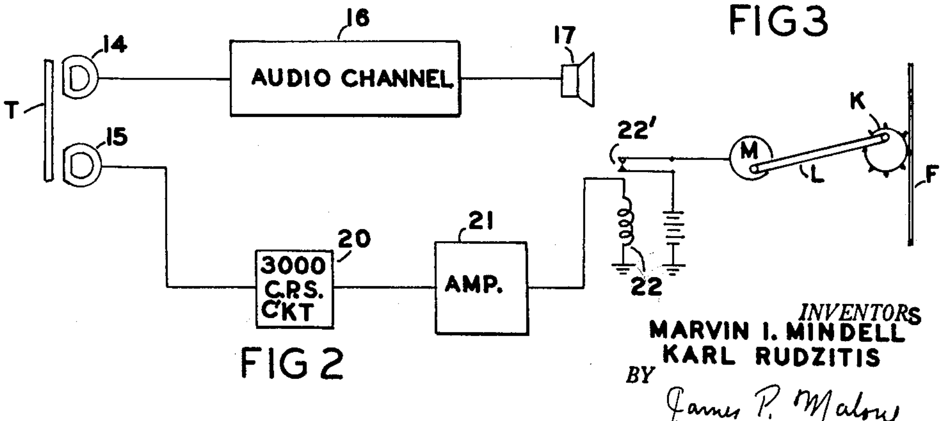
FIG. 2 is a schematic circuit diagram.

Referring more particularly to FIG. 2 the tape T is of the type having two separate tracks and a pair of magnetic pickups 14 and 15 are provided, one for each track. The pickup 14 is connected to an audio channel 16 which includes amplifying means, the output of which is connected to a speaker 17. The other pickup 15 picks up the synchronizing pulses on the other track for the purpose of actuating the film movement and it is connected to a selective circuit 20 which is tuned for instance to 3000 cycles per second, which is a convenient frequency for the pulses. The output of the selective circuit 20 is connected to an amplifier 21 and its output is connected to a relay 22 which actuates a switch 22′. The switch 22′ energizes the motor M which is connected to the film sprocket K by means of a link L as will be described. The film sprocket K is connected to advance the film F.

Figure 3:
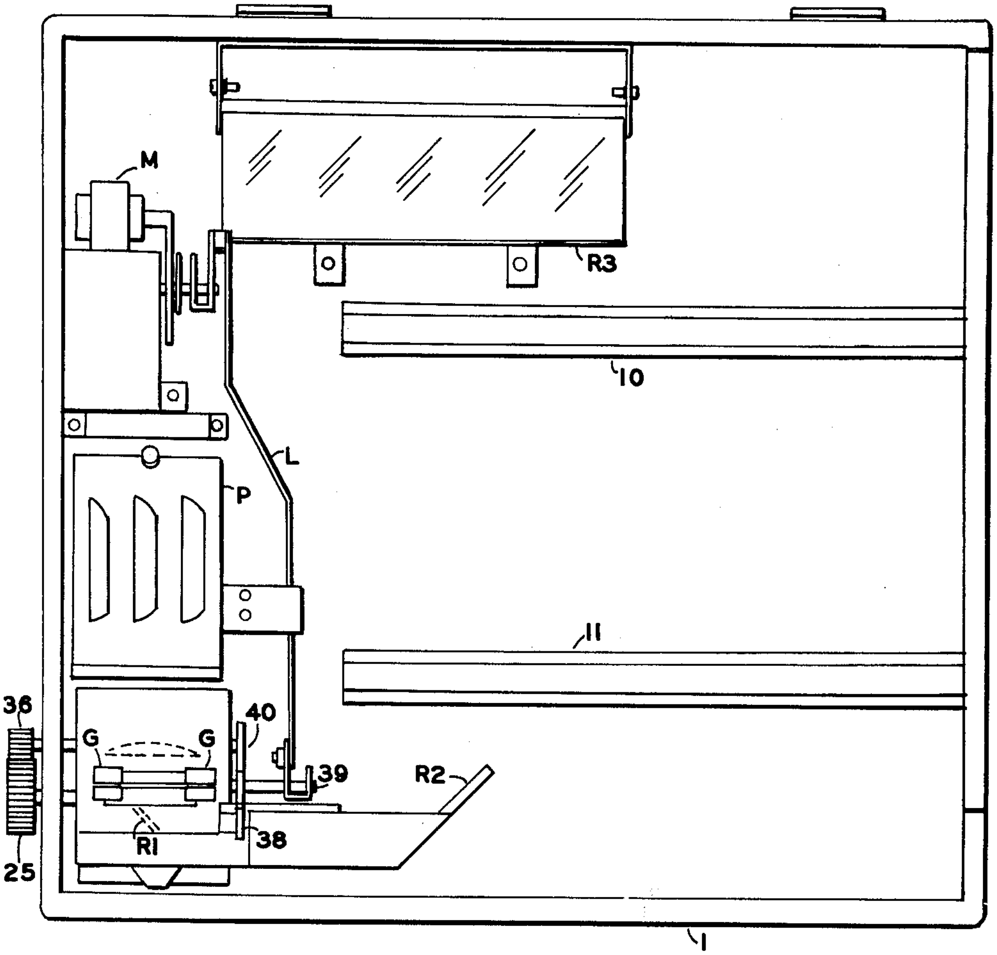
FIG. 3 is a plan view of the embodiment of FIG. 1 with the cover and the magnetic tape player removed.

Referring now to FIG. 3, there is shown a view of the case 1 with the cover, screen and magnetic tape amplifier deck removed in order to illustrate the projection of the pictures. At the lefthand side of the case 1 is mounted a projector P which comprises a conventional projector lamp with conventional reflector and lens system. The film is inserted downwardly through the guides G where it engages sprocket K which is mounted on shaft 39. Shaft 39 is adapted to be advanced by manual knob 25 or by means of the motor which is synchronized with the pulses, as will be explained. The light passes from the projector P through the film which is in the plane defined by the guides G. The light is then reflected from mirror R1, through focus lens 38 to mirror R2 to mirror R3 and then on to the rear of the screen 13.

Figure 5:
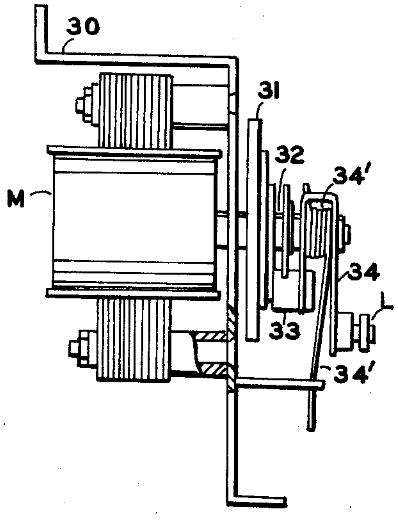
FIGS. 5 and 5A are front and side views of the motor drive means for the film.
Figure 5A:
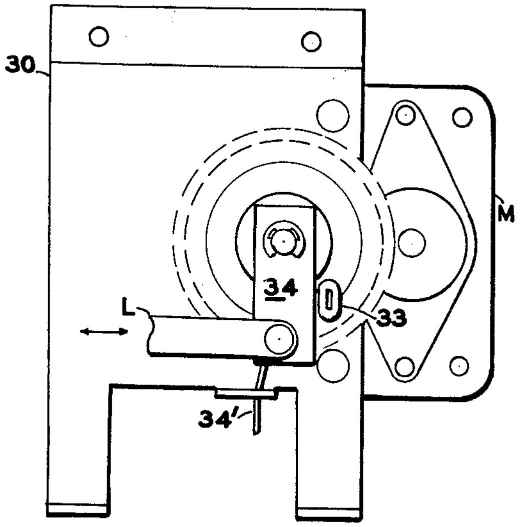

Referring also to FIGS. 5 and 5A the motor drive comprises motor M which is mounted on bracket 30 connected to the frame. The motor shaft is connected through conventional gearing 31 to a shaft 32 upon which is mounted an actuator paddle 33. The paddle 33 is adapted to contact the U-shaped connecting arm 34 which is pivotally mounted on the shaft 32 and spring loaded back against the paddle 33 by means of the spring 34'. On the outer end of the member 34 is pivotally mounted a connecting arm L, the other end of which is connected to the film sprocket drive as will be explained.

The operation of the motor drive is as follows:

When a synchronizing pulse is received, the relay 22 is pulsed or closed for a predetermined time. Therefore, the motor rotates the paddle 33 to rotate the member 34 clockwise in FIG. 5A which moves the link L to the left in FIG. 5A. As soon as the pulsed power is disconnected from the motor the spring 34' restores the paddle 33 to its original starting position.

The other end of the link L is connected to the film advance mechanism, the details of which are shown in FIGS. 6, 6A, 6B and 6C. The image is adapted to be focused by means of the lens 38 which is connected to a focus control shaft 37 and knob 36 by means of bracket 40. The focus lens F is slidably mounted in the frame 41 which is connected to the case.

The film sprocket K is rotatably mounted between the brackets 41 and 41' connected to the case. The sprocket is connected to the actuator by means of a pawl mechanism counted on the shaft 39. One end of the link L is pivotally connected to the arm 42 which is rotatably mounted on the shaft 39. Pivotally mounted on arm 42 is a pawl 43 which is spring loaded by means of spring 58 and adapted to actuate the ratchet wheel 45 which has four projections 45*a*, 45*b*, etc. When the lever L is moved to the left in FIG. 6A then the pawl is moved out of the plane of the paper in FIG. 6 causing the ratchet wheel to rotate clockwise in FIG. 6A, thereby advancing the film one frame.

The film advance is indexed by means of a detent pin 46 which is spring loaded against ratchet-detent sleeve 45 by means of the spring 47.

The film is also adapted to be advanced manually by means of the knob 25. Means are also provided to make a frame adjustment by means of pulling out the knob 25. The framing adjustment is as follows:

The shaft 39 extends all the way through and the sprocket K rides freely on the shaft. The collar 51 is pinned to the shaft and spring loaded against the sprocket by spring 52. The pin 55 connects the collar 51 to the sprocket and allows axial movement of the shaft and collar 51 with respect to the sprocket. The sprocket is spaced from the frame 41' by means of the spacer 56. The ratchet-detent sleeve 45 is not pinned to the shaft but is clutch connected to the shaft by means of the wave washer 58 and retaining ring 57. The ratchet wheel 45 is indexed by the detent pin 46 mounted in the U-shaped bracket 46'. The bracket 46' is mounted on the frame 41 and has a slot 46*a* which receives one of the projecting tabs 45, 45*a*, 45*b*, etc. when the knob 25 is pulled out.

Therefore, when the knob 25 is pulled out one of the tabs 45*a*, 45*b* slides into the slot 46*a*, thereby locking the ratchet detent wheel 45 to the frame. The film is then framed by turning the knob 25 in the pulled-out position. When the knob is released the entire shaft 39 assembly is moved by spring 52 to the operating position. The link L is flexible enough to permit this movement.

Figures 6, 6A, 6B, 6C:
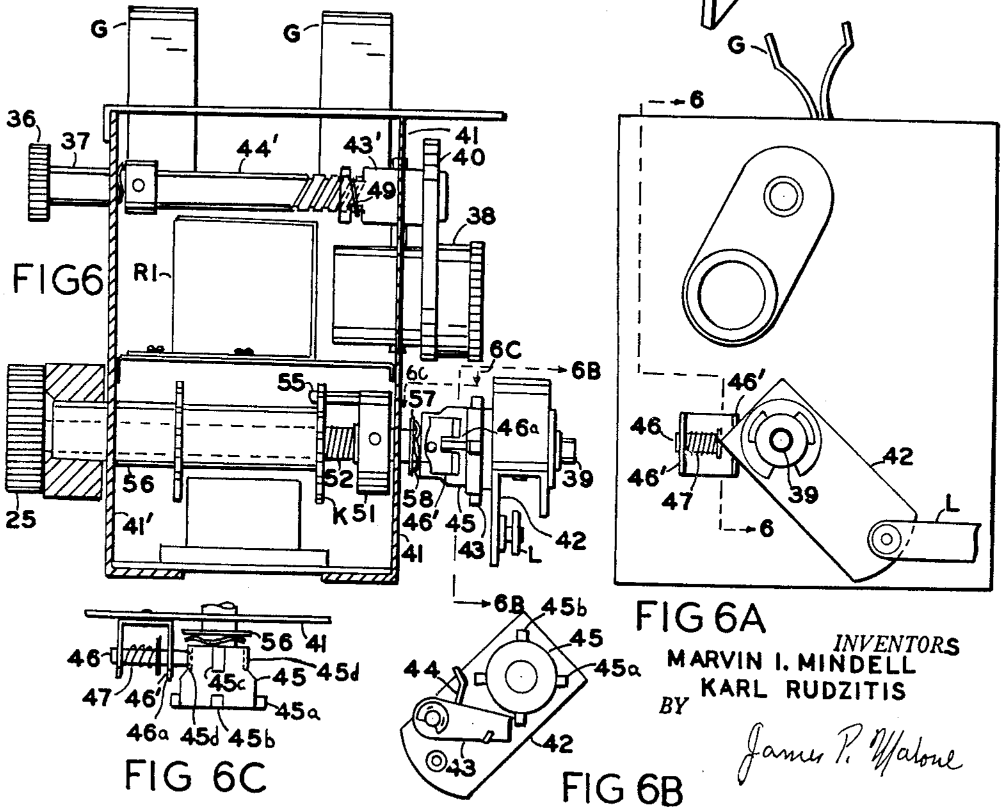
FIGS. 6 and 6A are front partly sectional and side views of the sprocket drive means for the film.
FIGS. 6B and 6C are detail views of FIG. 6.

Refering particularly to FIG. 6C the ratchet wheel 45 has four detent slots 45*c*, 45*d*, etc. which receive the detent pin 46. When the knob is pulled out for framing the detent pin rides up on the shoulder 45*c*.

Lens 38 is slidably mounted in frame 41 and connected by bracket 40 to nut 43' on threaded shaft 44'. Wire clip 49 in slot on nut 43' passes through threads on shaft 44'. When shaft 44' is turned by knob 36, nut 43', bracket 40 and lens 38 slides in or out to focus the image.

Figure 4:
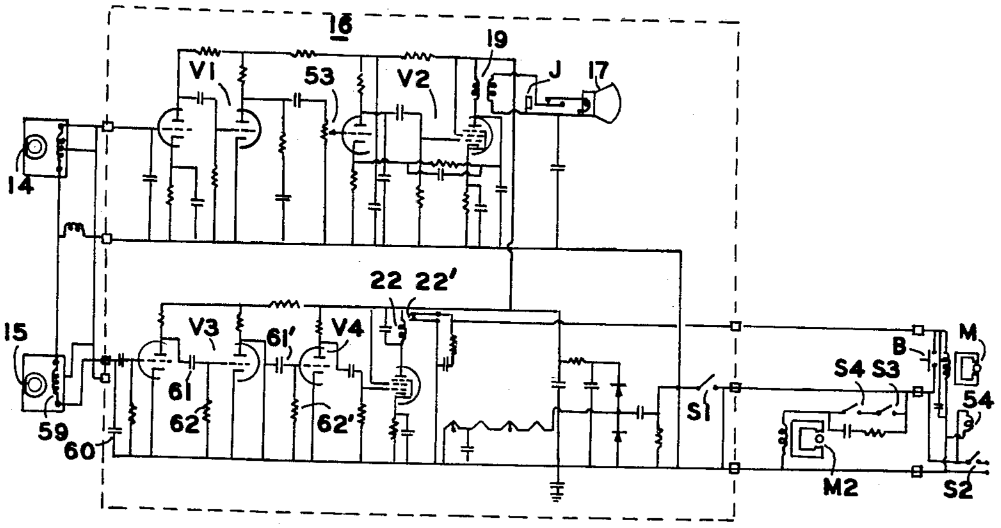
FIG. 4 is a schematic circuit diagram.

FIG. 4 shows a schematic circuit diagram. The magnetic pickup 14 picks up the audio content from the tape and applies it through the amplifier comprising the tubes V1 and V2 and their associated circuits which may be conventional. The output of the amplifier is connected through a transformer 19 to speaker 17 and jack J. The jack J may be used for inserting a head phone.

The magnetic pickup 15 picks up the synchronizing pulses on the other track of the tape, and applies them through a tuned circuit.

The tuned circuit comprises the capacitor 60 and the inductance 59 of the magnetic pickup. The capacitor 60 is chosen to tune the circuit to 3000 cycles per second. Capacitor 61 and resistor 62 and capacitor 61' and resistor 62' form high pass filters having a lower cutoff at 2500 cycles per second.

The pulse passes through the amplifiers V3 and V4 and operates relay 22 which actuates the film drive motor M. This pulsed energy therefore energizes the motor sufficiently for one cycle of the film advance. The film may also be advanced by manually pressing the push button B which is mounted on the top front of the case.

The tape drive motor M2 is operated by means of switch S3 and automatic stop switch S4 is preferably connected in series with switch S3 in order to stop the motor if the tape breaks. S1 is the conventional ON/OFF switch which is connected to the volume control 53. The switch S2 mounted on the top front of the case connects the apparatus to the source of electrical energy. When the switch S2 is closed the projection lamp 54 is energized. The tape drive may be conventional and of the type having forward and reverse directions and a fast forward speed for indexing. The film drive is not responsive to synchronizing pulses on the reverse and fast speeds due to the time constants chosen in the pickup circuits.

The operation of the system is as follows:

Unsnap case cover locks and lift cover. The rear projection viewing screen is preferably spring actuated and will pop into position automatically as the case cover is raised.

Slide tape deck 3 all the way out as shown in FIG. 1 by pulling. Plug power cord into any convenient 110–120 volts, 60 cycle A.C. outlet.

The master switch S2 turns on the projection lamp whereby the screen will become illuminated and energizes the film advance motor. Next, the ON/OFF volume control 53 knob S1 should be turned until it clicks "ON." This allows the amplifier to warm up.

Insert film strip leader into film channel guide G. Push film strip down as far as it will go, and while retaining slight downward pressure, turn the film advance knob (lower knob) 25 counter-clockwise (away from you), continue to turn knob until the "focus" frame appears on screen. Focus the picture by rotating focus knob 36. It may be necessary to frame the picture. This is done by pulling out on the film advance knob 25 and rotating it in either direction. Once framed the picture should remain properly framed throughout the entire strip. The film will advance automatically by pulse from the tape. The film may also be advanced manually by depressing the film advance button B. In this way a film may be put in "sync" with the sound, or the device may be used as a simple film strip viewer without sound.

To thread the tape program, place the supply reel of tape on the rear spindle and thread through the threading slot past the magnetic head 5. Before threading tape be sure that tape deck control switch S3 is in the "OFF" position. The end of the tape is then threaded into the empty takeup reel 7 which in turn is placed on the takeup spindle. Turn one revolution of the takeup reel, by hand, to insure proper threading and tape takeup.

The presentation is now ready and may be started by switching the tape deck control switch S3 into the "play" position. The prerecorded pulses on the lower track of the tape will advance the film at the proper intervals to insure synchronism with the audio presentation.

Upon completion of the presentation the off/volume switch S1 should be turned to the "OFF" position and then the tape rewound by turning the tape deck control switch to the "rewind" position. After tape has been rewound the master switch should be turned off.

An automatic shut-off switch S4 is provided to stop the tape mechanism in case the tape breaks or at the end of the reel.

If the operator desires to listen to the presentation without disturbing others in the room or area, a set of standard earphones may be plugged into the phone jack J. The insertion of the phone jack disconnects the loudspeaker and switches the program to earphones.

*Tape preparation*

Assume a normal tape program is recorded on the upper track, the pulses should be recorded on the lower track at the proper locations in the script in accordance with the following specifications.

| | |
|---|---|
| Pulse frequency | 3,000 c.p.s.±500 c.p.s. |
| Pulse amplitude | ODB standard recording level. |
| Pulse duration | 750 m.s.±20%. |
| Pulse channel | Lower track ½ track system. |

Many modifications may be made by those who desire to practice the invention without departing from the scope thereof which is defined by the following claims.

We claim:

1. Portable audio visual strip film means comprising
a case, a screen pivotally mounted in said case, means to hold said screen in viewing position,
film strip projection means mounted in said case, and adapted to project images onto said screen when said screen is in viewing position,
film strip advancing means connected to said projecting means, a deck member slidably mounted in said case under said screen,
audio means comprising a magnetic tape player means mounted in said deck member,
means to actuate and synchronize movement of said film strip with said magnetic tape, said last means comprising
a magnetic tape having two tracks, one of said tracks having audio content and the other of said tracks having synchronizing pulses,
a first magnetic pickup responsive to said first track to pick up said audio content,
a second magnetic pickup responsive to said second track to pick up said synchronizing pulses and motor means related to said second pickup and responsive thereto to actuate movement of said film strip.

2. Portable audio visual strip film means comprising
a case;
film strip projection means mounted in said case;
film strip advancing means connected to said projecting means;
audio means comprising a magnetic tape player means; and
means to actuate and synchronize movement of said film strip with said magnetic tape comprising
magnetic tape means having two tracks, one of said tracks having audio content and the other of said tracks having synchronized pulses,
a first magnetic pickup responsive to said first track to pick up said audio content,
a second magnetic pickup responsive to said second track to pickup said synchronized pulses and motor means related to said second pickup and responsive thereto to actuate movement of said film strip, said film movement means comprising
said motor having a shaft,
an actuator paddle connected to said shaft,
a lever freely mounted on said shaft, said actuator being adapted to contact and move said lever,
a connecting arm link pivotally connected on one end of said lever,
a film sprocket rotatably mounted on a shaft,
detent means connected to index said sprocket shaft at spaced distances corresponding to one frame advance of said film,
a ratchet wheel mounted on said sprocket shaft,
a pawl connected to be activated by the other end of said connecting arm link and adapted to contact and move said ratchet wheel whereby said motor is connected to advance said film one frame at a time.

References Cited by the Examiner

UNITED STATES PATENTS

| | | | |
|---|---|---|---|
| 1,052,209 | 2/13 | Bingham | 226—76 |
| 1,432,273 | 10/22 | Bohn et al. | 88—28 |
| 1,882,303 | 10/32 | Seaholm | 226—76 |
| 2,115,738 | 5/38 | Morrissey | 226—76 |
| 2,152,221 | 3/39 | Steiner | 226—76 |
| 2,503,083 | 4/50 | Waller | 88—28 |
| 2,567,499 | 9/51 | Vaughn | 88—28 |
| 2,606,476 | 8/52 | Waller et al. | 88—28 |
| 2,889,742 | 6/59 | Marturano | 88—28 |
| 2,966,094 | 12/60 | Miller | 88—28 |

NORTON ANSHER, *Primary Examiner.*

EMIL G. ANDERSON, *Examiner.*